United States Patent [19]

Simic

[11] 4,164,428

[45] Aug. 14, 1979

[54] PLASTICIZED SULFUR COMPOSITION

[75] Inventor: Milutin Simic, Novato, Calif.

[73] Assignee: Chevron Research Company, San Francisco, Calif.

[21] Appl. No.: 882,686

[22] Filed: Mar. 2, 1978

[51] Int. Cl.² .................... C01B 17/00; C09K 3/00
[52] U.S. Cl. .................... 106/287.13; 106/287.16; 106/287.32; 423/265; 423/567 R
[58] Field of Search .................... 106/287.32, 287.13, 106/287.16, 20; 423/265, 567 R; 260/79.5 B

[56] References Cited

U.S. PATENT DOCUMENTS

| | | | |
|---|---|---|---|
| 2,462,146 | 2/1949 | Walcutt | 423/265 |
| 2,756,220 | 7/1956 | Brooks et al. | 260/79.5 |

*Primary Examiner*—Theodore Morris
*Attorney, Agent, or Firm*—D. A. Newell; John Stoner, Jr.; A. T. Bertolli

[57] ABSTRACT

A plasticized sulfur composition having improved chemical resistance, comprising at least 50% by weight sulfur, a sulfur plasticizer, a mineral suspending agent, and an organosilane stabilizing agent.

9 Claims, No Drawings

PLASTICIZED SULFUR COMPOSITION

BACKGROUND OF THE INVENTION

The composition of this invention is a plasticized sulfur coating comprising at least 50% by weight sulfur. The invention concerns the use of organosilanes in combination with finely divided particulate mineral suspending agents to improve the chemical resistances of the plasticized sulfur coatings.

Plasticized sulfur-based coating compositions are well known. Generally, they comprise at least 50% by weight sulfur, a sulfur plasticizer, and a filler. For instance, U.S. Pat. No. 4,026,719 granted May 31, 1977 to Simic describes plasticized sulfur coating compositions comprising sulfur, a plasticizer, and a mineral filler. In addition, U.S. Pat. No. 4,026,719 summarizes several articles and other patents which teach various plasticized sulfur compositions comprising sulfur, a plasticizer, and a filler.

In addition to the three principal ingredients, plasticized sulfur coating compositions may also comprise dyes or pigments, aggregate such as gravel, rock, or sand or the like. Each of these additional optional ingredients adapts the coating to a particular use. For instance, the addition of sand to a typical plasticized sulfur coating provides a textured appearance particularly desirable when the coating is applied as a surface bonding material on the exterior of a building. Gravel or rock is used to adapt the plasticized sulfur coating for use as roadbed coating similar to concrete or asphalt.

As a rule, the mechanical properties of plasticized sulfur compositions have been altered by varying either the plasticizing system, sometimes by adding a viscosity increasing or reducing agent, or the filler or both. Thus, for instance, U.S. Pat. No. 3,823,019 granted July 1974 to Dale et al teaches plasticized sulfur compositions specifically comprising dicyclopentadiene, glass fiber, and talc. Similarly, U.S. Pat. No. 4,026,719 teaches plasticized sulfur composition specifically containing a mica filler.

While the mechanical properties of plasticized sulfur coating compositions can be adapted and optimized by varying the plasticizer or the filler to fit the specific end use, the final coatings nonetheless tend to lose strength during use, especially under exposure to strong chemical action as in the floors and walls of an acid pit. Accordingly, it would be advantageous to provide a composition which could be adapted to a specific use by the selection of an appropriate plasticizer and filler and could be stabilized against the tendency to lose strength during chemical attack.

SUMMARY OF THE INVENTION

It has now been found that plasticized sulfur coating compositions comprising at least 50% by weight sulfur and a sulfur plasticizer can be strengthened and stabilized against chemical attack by incorporating into the composition a finely divided particulate mineral suspending agent and an organosilane stabilizing agent.

DETAILED DESCRIPTION OF THE INVENTION

Among other factors, this invention is based upon the discovery that plasticized sulfur compositions comprising at least 50% by weight sulfur, and a sulfur plasticizer are strengthened and stabilized by the addition of a finely divided particulate mineral suspending agent and an organosilane stabilizing agent. Accordingly, the composition of this invention comprises sulfur, a sulfur plasticizer, a mineral suspending agent, and an organosilane.

Sulfur is the major ingredient of the composition of this invention, and is present in amounts of at least 50% by weight of the composition. Preferably the amount of sulfur in the composition varies from about 60% by weight to about 98% by weight of the composition. Especially preferred amounts of sulfur range from about 70% by weight to about 97% by weight of the composition. The sulfur may be present in the composition as the result of either the addition of free sulfur or the addition of a sulfur plasticizer already comprising sulfur. For instance, as detailed below, the aromatic polysulfides are one class of preferred plasticizers. Aromatic polysulfide can be prepared by the reaction of excess sulfur with a reactive aromatic compound. Thus, the resulting plasticizer is a reaction product comprising excess unreacted sulfur and a sulfur bridged polyaromatic. For purposes of determining the sulfur content of the composition of this invention, both the unreacted sulfur and the incorporated sulfur of the sulfur bridged polyaromatic are included.

The composition of this invention includes a sulfur plasticizer which is present in amounts ranging from about 0.05% by weight to about 25.0% by weight of the composition. Preferably the amount of sulfur plasticizer ranges from about 0.2% by weight to about 5.0% by weight of the composition. Most preferably the plasticizer is present in an amount between about 1.0% by weight and 2.0% by weight of the composition.

As conventionally understood and as used herein, the term "sulfur plasticizer" includes materials or mixtures of materials which when added to sulfur lower its melting point and increase its crystallization time. One useful way to measure the rate of crystallization is as follows: the test material (0.040 g) is melted on a microscope slide at 130° C. and is then covered with a square microscope slide cover slip. The slide is transferred to a hot plate and is kept at a temperature of 70°±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself.

Inorganic plasticizers include iron, arsenic and phosphorus sulfides, but the particularly preferred plasticizers are organic compounds which react with sulfur to give sulfur-containing materials.

Sulfur plasticizers which are suitable include aliphatic polysulfides, aromatic polysulfides, styrene, dicyclopentadiene, dioctylphthalate, acrylic acid, epoxidized soybean oil, triglycerides, and tall oil fatty acids.

One class of preferred plasticizers is the aliphatic polysulfides, particularly those that will not form cross-linking. Thus butadiene is not a preferred constituent to form the aliphatic polysulfide, as it may form cross-linking sulfur bonds, whereas dicyclopentadiene is a preferred compound for forming the aliphatic polysulfide useful as the sulfur plasticizer. With molten sulfur, dicyclopentadiene forms an extremely satisfactory aliphatic polysulfide.

Another class of preferred plasticizers for use in the composition of the present invention are aromatic polysulfides formed by reacting one mol of an aromatic carbocyclic or heterocyclic compound, substituted by at least one functional group of the class —OH or —NHR in which R is H or lower alkyl with at least two mols of sulfur.

Suitable aromatic compounds of this type include: phenol, aniline, N-methyl aniline, 3-hydroxy thiophene, 4-hydroxy pyridine, p-aminophenol, hydroquinone, resorcinol, meta-cresol, thymol, 4,4'-dihydroxy biphenyl, 2,2-di(p-hydroxyphenol) propane, di(p-hydroxy phenyl) methane, etc., p-phenylene diamine, methylene dianiline. Phenol is an especially preferred aromatic compound to form the aromatic polysulfide.

The aromatic polysulfides are generally prepared by heating sulfur and the aromatic compound at a temperature in the range of 120° to 170° C. for 1 to 12 hours, usually in the presence of a base catalyst such as sodium hydroxide. (See for example, Angew, Chem. Vol. 70, No. 12, pages 351-67 (1958), the polysulfide product made in this way has a mol ratio of aromatic compound: sulfur of the 1:2 to 1:10, preferably from 1:3 to 1:7. Upon completion of the reaction, the caustic catalyst is neutralized with an acid such as phosphoric or sulfuric acid. Organic acids may also be used for this purpose. The resulting aromatic polysulfide may be used immediately or it may be cooled and stored for future use.

Another type of aliphatic polysulfide useful as a plasticizer for this invention are the linear aliphatic polysulfides. Although these polysulfides may be used alone as the sulfur plasticizer, it is preferred to use them in combination with either (a) dicyclopentadiene or (b) the aromatic polysulfides described above, especially with the phenol-sulfur adduct. In this connection, the preferred plasticizer mixtures contain from 5 to 60% linear aliphatic polysulfide by weight based on total plasticizer, preferably about 20 to 50 weight percent.

These aliphatic polysulfides may have branching indicated as follows:

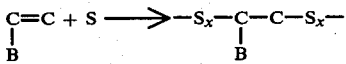

wherein x is an integer of from 2 to 6 and wherein B is H, alkyl, aryl, halogen, nitrile, ester or amide group. Thus in this connection the aliphatic polysulfide is preferably a linear polysulfide. The chain with the sulfur preferably is linear, but it can have side groups as indicated by B above. Also, this side group B may be aromatic. Thus styrene can be used to form a phenyl-substituted linear aliphatic polysulfide. The preferred aliphatic polysulfides of this type are both linear and non-branched.

Unbranched linear aliphatic polysulfides include those such as Thiokol LP-3 which contains an ether linkage and has the recurring unit:

wherein x has an average value of about 12. The ether constituent of this aliphatic polysulfide is relatively inert to reaction. Other suitable aliphatic polysulfides have the following recurring units:
- —S$_x$—(—CH$_2$—)$_y$S$_x$- from reaction of alpha, omega-dihaloalkanes and sodium polysulfide
- —S$_x$—(—CH$_2$CH$_2$-S-CH$_2$CH$_2$—)—S$_x$— from reaction of alpha, omega-dihalosulfides and sodium polysulfide
- —S$_x$—(—CH$_2$CH$_2$-O-CH$_2$CH$_2$—)—S$_x$— from reaction of alpha, omega-dihaloesters and sodium polysulfide wherein x is an integer of 2 to 5; and y is an integer of 2 to 10.

As discussed above, a finely divided particulate mineral suspending agent and an organosilane stabilizing agent are essential ingredients in the composition of this invention. The amount of mineral suspending agent may vary over a broad range. Suitable amounts are from about 1% by weight to about 40% by weight of the composition. Preferred amounts of mineral suspending agent range from about 5% by weight to about 30% by weight of the composition, and particularly preferred amounts range from about 10% by weight to about 20% by weight of the composition. The amount of organosilane stabilizing agent is relatively small. Minor amounts ranging from about 0.01% by weight to about 1% by weight of the composition are suitable. The preferred amounts of stabilizing agent range from about 0.1% by weight to about 0.8% by weight of the composition, and particularly preferred amounts range from about 0.2% by weight to about 0.6% by weight of the composition.

Particulate mineral suspending agents are well known in the art. Satisfactory particles have sizes ranging in the average diameter from about 0.001 mm to about 2 mm. The term "particulate" or "particle" is not intended to exclude materials which are finely divided layered materials such as micas. Accordingly, mineral suspending agents which are suitable for use herein include, for example, talcs, clays, micas, silicas, barium carbonate or sulfate, calcium carbonate or sulfate, magnesium carbonate or oxide, graphite, carbon black, pumice, and the like.

Micas are a particularly preferred class of particulate mineral suspending agent. The term "mica" is used herein to mean a layered silicate having an x-ray diffraction pattern d spacing about 9.6 to 10.1 A, preferably a d spacing of about 9.9 to 10.1 A. Satisfactory mica particles cover a very broad range of sizes. It is preferred that at least 90 percent pass through a 40-mesh (Tyler) screen. Satisfactory particles have sizes ranging in diameter from 0.001 to 2 mm and in thickness from 0.0005 to 0.2 mm.

Preferred micas for use in the composition of the present invention are phlogopite, muscovite, zinnwaldite and biotite, which are natural micas, and fluorophlogopite and barium disilic, which are synthetic micas.

Particularly preferred micas for use in the present invention contain potassium and have a chemical composition of 3Al$_2$O$_3$·K$_2$O·6SiO$_2$·2H$_2$O, also written K$_2$Al$_4$(Al$_2$Si$_6$O$_{20}$)(OH)$_4$.

Organosilane stabilizing agents which are suitable for use in the composition of this include silanes having the atomic structure

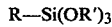

wherein R is an organic radical having at least one functional group such as an amino group, an epoxy or vinyl group, a methacryloxy group or a mercaptan group; and each R' is a lowmolecular-weight alkyl group. R is usually bonded to the silicon atom by a short alkyl chain. Such materials are commercially available as adhesion promoters used with various polymeric materials such as epoxy resins, polyesters, polycarbonates, nylons, sulfur-cured elastomers, and mineral-filled compositions. For instance, Union Carbide markets a series of silane adhesion promoters suitable for use in the composition of this invention. Representative organosilanes suitable for use as stabilizing agents in the composition of this invention include, for example, vinyltriethoxysilane, gamma-methacryloxypropyltrimethoxysilane, beta-(3,4-epoxycyclohexyl)-ethyltrimethoxysilane, gamma-glycidoxypropyltrimethoxysilane, gamma-aminopropyltrimethoxysilane and gamma-mercaptopropyltrimethoxysilane. Gamma-methacryloxypropyltrimethoxysilane and gamma-glycidoxypropyltrimethoxysilane are preferred stabilizing agents.

In addition to the four essential ingredients of the composition, detailed above, various optional materials can be added to the composition. For instance, pigments or aggregates, sand, mine tailings, hydrated alumina, etc., may be added as desired. Fibrous fillers such as asbestos or glass may be optionally used, but do not satisfy the need for a finely divided particulate mineral suspending agent. In this regard, the compositional amounts specified for sulfur, the sulfur plasticizer, the suspending agent, and the stabilizing agent are based upon the weight of the composition before the addition of any optional ingredients.

The composition may be prepared in conventional fashion. The order of addition of the four essential ingredients is not critical. However, it is preferable to mix the sulfur and sulfur plasticizer prior to the addition of the suspending agent and stabilizing agent. Thus, in the preferred mode of preparation the sulfur plasticizer and sulfur are combined in molten form at a temperature above the melting point of the materials, usually above about 110° C. and preferably between 125° C. and 150° C. After thorough mixing, the sulfur and plasticizer can be cooled until solid forming a precursor which can be remelted and combined with the suspending agent and stabilizer at the point of use. Typical mixing times for the combination of the plasticized sulfur with the suspending agent and stabilizing agent range from about five minutes to about one hour.

The composition is useful in water impoundment; in providing floors and slabs resistant to abusive foot traffic, corrosive chemicals, and the like; in lining irrigation ditches; and in consolidating and retaining in place earth, such as on embankments, to prevent erosion. The strength retention of the compositions of this invention is important in most of these services.

The composition is typically applied in the molten form as, for example, by spraying or painting onto the surface desired to be covered by the composition, preferably by spraying.

EXAMPLES

The following examples illustrate the preparation and advantages of representative embodiments of the composition of this invention. Those familiar with the art will readily perceive alternative embodiments.

EXAMPLES 1-9

The sulfur coating compositions illustrated by Examples 1-9 were prepared by charging the indicated parts by weight of sulfur to a stainless-steel beaker. This sulfur was heated until molten at a temperature of about 145° C. Then the indicated parts of plasticizer were added to the stirred, molten sulfur, and the resulting mixture was heated until homogeneous, about one-sixth hour. The suspending agent and the stabilizer were added and the entire mixture was stirred and heated at the above temperature for 1 hour.

At the end of this time, the sulfur-containing composition was fashioned into test specimens as described broadly in ASTM D-790-71 for the flexural test. In particular, test specimens were prepared by pouring the molten sulfur-containing composition into a mold. After hardening, the composition was removed from the mold and sliced into specimens ¾" by ½" by 7". Each specimen was then weighed. Eight specimens were used per test. The results are the average value of these eight. In addition, strength determinations were made on eight fresh specimens. Strength retention tests were carried out by exposing eight specimens of each formulation to 2 N sulfuric acid, at room temperature and at 60° C. for the indicated time. After completion of the exposure, the specimens were removed from the acid solution, rinsed with water, and dried. The dry specimens were weighed, and then tested for flexural properties. The results are given in the following table.

Similar compositions are prepared by replacing the mica with talc (Mistron Vapor), clay (Kaopague-30), or silica (Cab-O-Sil) and similar results are obtained.

TABLE I

| | | | | Acid Resistance to $H_2SO_4$-2N | | | | | |
|---|---|---|---|---|---|---|---|---|---|
| | | | At Room Temperature | | | | At 60° C. | | |
| | | Initial | One Month | | Three Months | | One Month | | Three Months | |
| Example No. | Composition Parts-By-Weight | Flexural Strength (PSI) | Wt. Gain (%) | Flexural Strength (%)* | Wt. Gain (%) | Flexural Strength (%)* | Wt. Gain (%) | Flexural Strength (%)* | Wt. Gain (%) | Flexural Strength (%)* |
| Control A | Sulfur 79.5 | | | | | | | | | |
| | PSA[1] 2.0 | | | | | | | | | |
| | LP-3[2] 0.5 | 2300 | 0.5 | 63 | 1.2 | 56 | 1.6 | 41 | 1.5 | 36 |
| | Mica[3] 18.0 | | | | | | | | | |
| 1 | Control A 100 | 2000 | 0.1 | 70 | 0.4 | 71 | 0.6 | 56 | 1.0 | 59 |
| | Vinyltri- 0.25 ethoxysilane | | | (10)[4] | | (27) | | (36) | | (64) |
| 2 | Control A 100 | 2150 | 0.03 | 86 | 0.2 | 87 | 0.2 | 60 | 0.6 | 66 |
| | Gamma- 0.25 methacryloxypropyltrimethoxysilane | | | (36) | | (55) | | (46) | | (83) |
| 3 | Control A 100 | 2240 | 0.14 | 88 | 0.23 | 83 | 0.26 | 63 | 0.34 | 64 |
| | Gamma- 0.25 | | | (40) | | (48) | | (51) | | (78) |

| Example No. | Composition Parts-By-Weight | | Initial Flexural Strength (PSI) | Acid Resistance to H₂SO₄-2N | | | | | | | |
|---|---|---|---|---|---|---|---|---|---|---|---|
| | | | | At Room Temperature | | | | At 60° C. | | | |
| | | | | One Month | | Three Months | | One Month | | Three Months | |
| | | | | Wt. Gain (%) | Flexural Strength (%)* | Wt. Gain (%) | Flexural Strength (%)* | Wt. Gain (%) | Flexural Strength (%)* | Wt. Gain (%) | Flexural Strength (%)* |
| | glycidoxypropyltrimethoxysilane | | | | | | | | | | |
| 4 | Control A | 100 | 2100 | 0.16 | 80 | 0.05 | 86 | 0.1 | 60 | 0.43 | 60 |
| | Gamma-mercaptopropyltrimethoxysilane | 0.25 | | | (27) | | (54) | | (46) | | (67) |
| 5 | Control A | 100 | 2300 | 0.15 | 94 | 5 | — | 0.4 | 57 | — | — |
| | Gamma-glycidoxypropyltrimethoxysilane | 0.05 | | | (49) | | | | (39) | | |
| 6 | Control A | 100 | 2600 | 0.1 | 85 | — | — | 0.3 | 58 | — | — |
| | Gamma-glycidoxypropyltrimethoxysilane | 0.10 | | | (35) | | | | (41) | | |
| 7 | Control A | 100 | 2100 | 0.24 | 79 | 0.6 | 73 | 0.4 | 64 | 0.8 | 68 |
| | Gamma-glycidoxypropyltrimethoxysilane | 0.50⁶ | | | (25) | | (30) | | (56) | | (81) |
| Control B | Sulfur | 81.5 | | | | | | | | | |
| | DCP | 1.0 | 2200 | 0.4 | 76 | — | — | 0.5 | 52 | — | — |
| | LP-3 | 0.5 | | | | | | | | | |
| | Mica | 17.0 | | | | | | | | | |
| 8 | Control B | 100 | 2300 | 0.01 | 91 | — | — | 0.5 | 64 | — | — |
| | Gamma-glycidoxypropyltrimethoxysilane | 0.10 | | | (20) | | | | (23) | | |
| Control C | Sulfur | 48.3 | | | | | | | | | |
| | PSA | 1.2 | | | | | | | | | |
| | LP-3 | 0.3 | 2100 | — | 58 | — | — | — | 36 | — | — |
| | Mica | 10.2 | | | | | | | | | |
| | Sand | 40.0 | | | | | | | | | |
| 9 | Control C | 100 | 2100 | — | 71 | — | — | — | 60 | — | — |
| | Gamma-glycidoxypropyltrimethoxysilane | 0.10 | | | (22) | | | | (67) | | |

Footnotes:
¹Aromatic polysulfide of phenol and sulfur.
²Linear aliphatic polysulfide sold by Thiokol Co.
³P-80-P Mica sold by U.S. Gypsum.
⁴Percent improvement over control.
⁵No measurement taken.
⁶Stabilizing agent added as last ingredient, in all other cases added before filler.
⁷Dicyclopentadiene.
*Flexural strength expressed as percent of initial value.

The above results show that the silane-containing compositions of this invention absorb much less liquid than the known compositions. The compositions of this invention also have a 10 to 80% greater strength of retention. For many uses, a 3-month strength retention in 2 N sulfuric acid of over 40% at 60° C. is necessary for use in strong acid environments.

What is claimed is:

1. A plasticized sulfur composition comprising at least 50% by weight sulfur, a sulfur plasticizer, a finely divided particulate mineral suspending agent and an organosilane stabilizing agent having the formula R—Si(OR')₃ wherein R is an organic radical having at least one functional group selected from the group consisting of amino, epoxy, vinyl, methacryloxy and mercapto groups, and wherein R' is a low molecular weight alkyl group.

2. A composition according to claim 1 comprising at least 50% by weight sulfur, from about 0.5% to about 25% by weight sulfur plasticizer, from about 1% to about 40% by weight suspending agent, and from about 0.01% to about 1% by weight organosilane stabilizing agent.

3. A composition according to claim 2 comprising from about 60% to about 98% by weight sulfur, from about 0.2% to about 5% by weight sulfur plasticizer, from about 5% to about 30% by weight suspending agent and from about 0.1% to about 0.8% by weight organosilane stabilizing agent.

4. A composition according to claim 3 comprising from about 70% to about 97% by weight sulfur, from about 1% to about 2% by weight sulfur plasticizer, from about 10% to about 20% by weight suspending agent, and from about 0.2% to about 0.6% by weight organosilane stabilizing agent.

5. A composition according to claim 1 wherein the organosilane stabilizing agent is selected from gamma-methacryloxypropyltrimethoxysilane and gamma-glycidoxypropyltrimethoxysilane.

6. A composition according to claim 1 wherein the finely divided particulate suspending agent is selected from the group consisting of talcs, clays, micas, and silicas.

7. A composition according to claim 6 wherein the suspending agent is a mica.

8. A composition according to claim 1 wherein the sulfur plasticizer is selected from the group consisting of aliphatic polysulfides, aromatic polysulfides and mixtures thereof.

9. A plasticized sulfur coating composition comprising about 80% by weight sulfur, about 2% by weight of an aromatic polysulfide formed by reacting 1 mol of phenol with at least 2 mols of sulfur, 0.5% by weight of a linear aliphatic polysulfide having the recurring unit

about 18% by weight mica, and about 0.2% by weight gamma-glycidoxypropyltrimethoxysilane.

UNITED STATES PATENT AND TRADEMARK OFFICE
CERTIFICATE OF CORRECTION

PATENT NO. : 4,164,428
DATED : August 14, 1979
INVENTOR(S) : MILUTIN SIMIC

It is certified that error appears in the above-identified patent and that said Letters Patent are hereby corrected as shown below:

Column 7, Table I, second column, opposite Control B, "DCP" should read --$DCP^7$--.

Column 7, Table I, seventh column, opposite 5, "5" should read -- $-^5$ --.

Column 7, Table I, footnote 3, "P-80-P" should read --P-80-F--.

Signed and Sealed this

Twenty-second Day of January 1980

[SEAL]

Attest:

SIDNEY A. DIAMOND

Attesting Officer     Commissioner of Patents and Trademarks